US012437176B2

(12) United States Patent
Kikuchi et al.

(10) Patent No.: US 12,437,176 B2
(45) Date of Patent: Oct. 7, 2025

(54) DISPLAY MEDIUM, CODE GENERATION METHOD, AND CODE READING METHOD

(71) Applicant: DENSO CORPORATION, Kariya (JP)

(72) Inventors: Shinichi Kikuchi, Kariya (JP); Mitsuo Okumura, Kariya (JP); Tatsuya Okabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/953,930

(22) Filed: Nov. 20, 2024

(65) Prior Publication Data

US 2025/0077825 A1     Mar. 6, 2025

Related U.S. Application Data

(63) Continuation of application No. PCT/JP2023/015950, filed on Apr. 21, 2023.

(30) Foreign Application Priority Data

May 23, 2022   (JP) ................................ 2022-083973

(51) Int. Cl.
    *G06K 19/06*      (2006.01)
(52) U.S. Cl.
    CPC ............................. *G06K 19/06037* (2013.01)

(58) Field of Classification Search
    CPC .... G06K 19/06037; G06K 7/14; G06K 19/06; G06K 19/0614
    See application file for complete search history.

(56) References Cited

U.S. PATENT DOCUMENTS

| 2016/0162767 | A1* | 6/2016 | Ito .................... G06K 19/06046 235/494 |
| 2019/0228277 | A1* | 7/2019 | Baba ................ G06K 19/06037 |
| 2023/0094590 | A1 | 3/2023 | Okabe |

FOREIGN PATENT DOCUMENTS

TW         I756568 B   *  3/2022

* cited by examiner

*Primary Examiner* — Sonji N Johnson
(74) *Attorney, Agent, or Firm* — Maschoff Brennan

(57) ABSTRACT

An information code, which is displayed on a display medium, is generated by combining a first code and a second code. In each of the first code and the second code, information is recorded by multiple cells arranged in a two-dimensional array. The information code includes: a light color cell; a dark color cell; a central light color cell which includes a central light color region and an outer dark color region, the central light color region being surrounded by the outer dark color region within the central light color cell; and a central dark color cell which includes a central dark color region and an outer light color region, the central dark color region being surrounded by the outer light color region within the central dark color cell.

6 Claims, 6 Drawing Sheets

| PUBLIC CODE | CONFIDENTIAL CODE | INFORMATION CODE |
|---|---|---|
| BLACK | BLACK | BLACK |
| BLACK | WHITE | CENTRAL BLACK |
| WHITE | BLACK | CENTRAL WHITE |
| WHITE | WHITE | WHITE |

DISPLAY MEDIUM, CODE GENERATION METHOD, AND CODE READING METHOD

CROSS REFERENCE TO RELATED APPLICATIONS

The present application is a continuation application of International Patent Application No. PCT/JP2023/015950 filed on Apr. 21, 2023, which designated the U.S. and claims the benefit of priority from Japanese Patent Application No. 2022-083973 filed on May 23, 2022. The entire disclosures of all of the above applications are incorporated herein by reference.

TECHNICAL FIELD

The present disclosure relates to a medium displaying information code, a generation method and a reading method of information code.

BACKGROUND

There has been known a technology that generates an information code by combining two two-dimensional codes. The information code includes a light gray cell and a dark gray cell in addition to a black cell and a white cell. Based on a two-dimensional array of such four types of cells, it is possible to read from, the information code, information of two two-dimensional codes.

SUMMARY

The present disclosure provides an information code, which is displayed on a display medium. The information code is generated by combining a first code and a second code. In each of the first code and the second code, information is recorded by multiple cells arranged in a two-dimensional array. The information code includes: a light color cell; a dark color cell; a central light color cell which includes a central light color region and an outer dark color region, the central light color region being surrounded by the outer dark color region within the central light color cell; and a central dark color cell which includes a central dark color region and an outer light color region, the central dark color region being surrounded by the outer light color region within the central dark color cell.

BRIEF DESCRIPTION OF DRAWINGS

Objects, features and advantages of the present disclosure will become apparent from the following detailed description made with reference to the accompanying drawings.

FIG. 5 is a flowchart showing details of code reading processing executed by a code scanner or the like.

DETAILED DESCRIPTION

Figure 1:
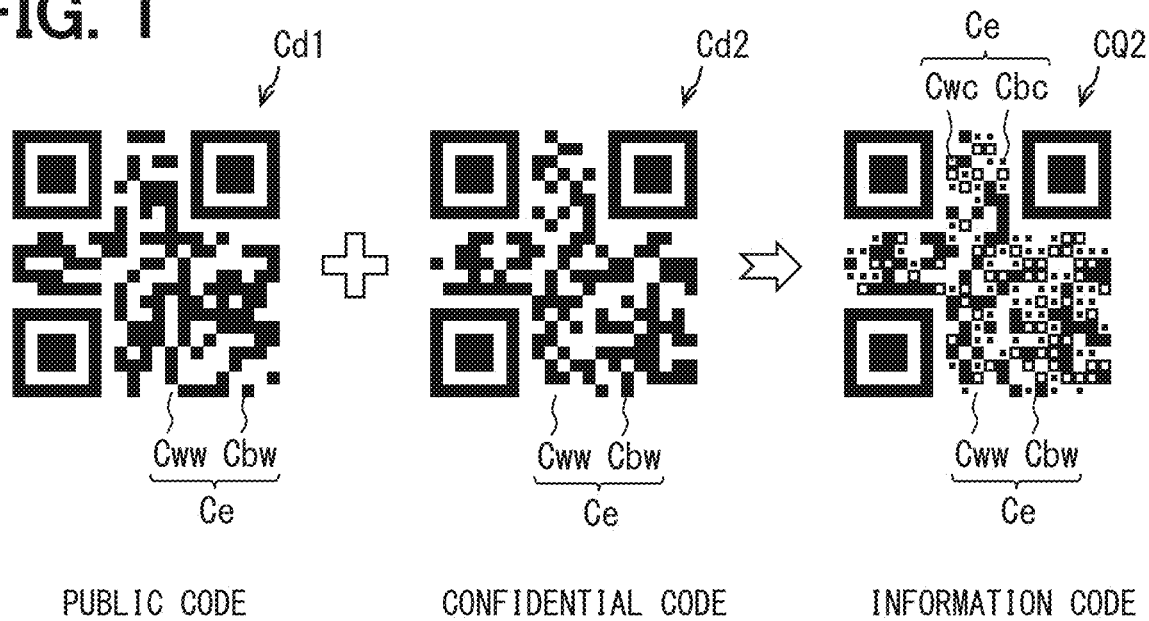
FIG. 1 shows an information code according to a first embodiment of the present disclosure.

In the above-described information code, darkness and lightness of a gray cell, which has an intermediate color, is likely to change due to an influence of light incident on the information code. Therefore, for example, when shadow is generated only in a part of the information code, it is difficult to distinguish between the light gray cell and the dark gray cell, and code reading is likely to fail.

According to an aspect of the present disclosure, an information code, which is displayed on a display medium, such as paper medium or is generated by combining a first code and a second code. In each of the first code and the second code, information is recorded by multiple cells arranged in a two-dimensional array. The information code includes: a light color cell; a dark color cell; a central light color cell which includes a central light color region and an outer dark color region, the central light color region being surrounded by the outer dark color region within the central light color cell; and a central dark color cell which includes a central dark color region and an outer light color region, the central dark color region being surrounded by the outer light color region within the central dark color cell.

According to another aspect of the present disclosure, a code generation method to be executed by at least one processor causes the at least one processor to perform: preparing a first code and a second code in each of which information is recorded by multiple cells arranged in a two-dimensional array; and generating an information code by combining the first code with the second code. The combining of the first code with the second code includes: setting a light color cell at a position where the first code and the second code both have light color cells; setting a dark color cell at a position where the first code and the second code both have dark color cells; setting a central light color cell at a position where the first code has the light color cell and the second code has the dark color cell, the central light color cell including a central light color region and an outer dark color region and the central light color region being surrounded by the outer dark color region; and setting a central dark color cell at a position where the first code has the dark color cell and the second code has the light color cell, the central dark color cell including a central dark color region and an outer light color region and the central dark color region being surrounded by the outer light color region.

According to another aspect of the present disclosure, a code reading method to be executed by at least one processor is provided. The code reading method reads a second code from an information code, and the information code is generated by combining a first code with the second code. In each of the first code and the second code, information is recorded by multiple cells arranged in a two-dimensional array. The code reading method includes determining, for each of the multiple cells included in the information code, a central light color cell, which includes an outer dark color region and a central light color region surrounded by the outer dark color region, as a dark color cell; and determining, for each of the multiple cells included in the information code, a central dark color cell which includes an outer light color region and a central dark color region surrounded by the outer light color region, as a light color cell.

In the above-described aspects, in addition to the light color cell and the dark color cell, the central light color cell and the central dark color cell are used. In the central light color cell, the central light color region is surrounded by the outer dark color region. In the central dark color cell, the central dark color region is surrounded by the outer light color region. Therefore, even when being affected by light incident on the information code, a difficulty in distinguishing the central light color cell from the central dark color cell can be suppressed. As a result, it is possible to reduce code reading failures.

An information code CQ2 according to an embodiment of the present disclosure shown in FIG. 1 is generated by combining two two-dimensional codes. Each two-dimensional code that serves as the basis of the information code CQ2 is, for example, a QR code (registered trademark) in which information is recorded by a two-dimensional array of multiple cells Ce. The information code CQ2 is printed on a paper medium or the like, and is used in the form of a code-printed medium such as a label, a sticker, or a tag. The information code CQ2 may be displayed on a display device such as a display or electronic paper.

The information code CQ2 in the present embodiment is generated by combining a public code Cd1 and a confidential code Cd2. When the information code CQ2 is read using a normal reader such as a code reader 13 (see FIG. 2) to be described later, the information code CQ2 is recognized as the public code Cd1. In this case, information recorded in the public code Cd1 (hereinafter referred to as public information) is read. On the other hand, the confidential code Cd2 is readable by using a special reader such as a code scanner 23 (see FIG. 2) to be described later. In this case, information recorded in the confidential code Cd2 (hereinafter referred to as confidential information) is read.

Figure 2:
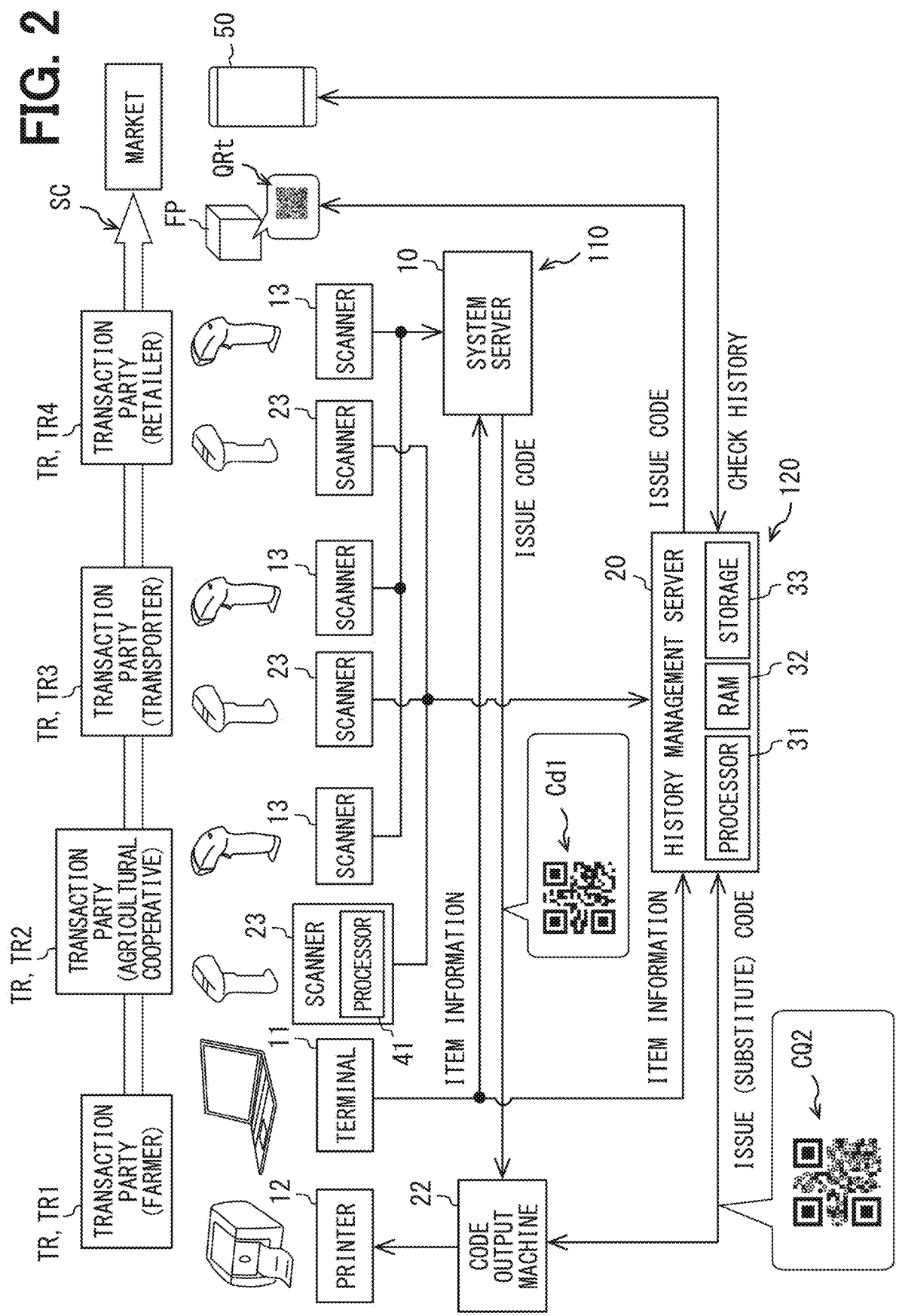
FIG. 2 shows an overall image when a traceability system is operated together with an existing distribution management system.

The information code CQ2 is used in both a distribution management system 110 and a traceability system 120 shown in FIG. 2. The distribution management system 110 and the traceability system 120 are management systems that manage a supply chain SC structured to include a large number of transaction parties TR. The supply chain SC is connection between the transaction parties for delivering an industrial product, an agricultural product, an aquatic product, and the like to an end user. As an example, in the supply chain SC for delivering an agricultural product to a consumer, the transaction parties TR includes a farmer TR1, an agricultural cooperative TR2 that is a collection facility, a transporter TR3, and a retailer TR4.

The distribution management system 110 collects, using the public code Cd1, a transaction record of a transaction item between the transaction parties TR. In other words, the public code Cd1 is a QR code used by the distribution management system 110. The distribution management system 110 includes an input terminal 11, a label printer 12, the code reader 13, and a system server 10. The input terminal 11, the label printer 12, and the code reader 13 are appropriately provided at a facility of each transaction party TR. The input terminal 11, the label printer 12, and the code reader 13 are connected, via a network, to the system server 10 provided at a data center or the like.

The input terminal 11 is, for example, a personal computer or a tablet terminal. Basic information on the transaction item (hereinafter referred to as item information) supplied to the supply chain SC is input to the input terminal 11 according to a predetermined format. For example, the item information includes an article name, a production place, a production facility, and a producer. The input terminal 11 transmits, to the system server 10, the item information on the transaction item shipped from the transaction party TR.

The label printer 12 is an output device for printing the public code Cd1 on a paper medium. The label printer 12 is a monochrome printer capable of executing only monochrome printing. The paper medium where the public code Cd1 is printed is attached to a package, an outer box, or the like of the transaction item to be shipped, and is distributed in a state of being attached to the transaction item.

The code reader 13 is a reading device that acquires the public information recorded in the public code Cd1 by reading the public code Cd1. The code reader 13 acquires the public information recorded in the public code Cd1 and transmits the acquired public information to the system server 10.

The system server 10 is a host node capable of communicating with the input terminal 11, the label printer 12, and the code reader 13. The system server 10 registers the item information acquired from the input terminal 11 in a database. The system server 10 prepares the public information associated with the item information and generates the public code Cd1 in which the public information is recorded. As processing for issuing the public code Cd1, the system server 10 transmits image data of the generated public code Cd1 to the label printer 12 that is a transmission source of the item information. When the issued public code Cd1 is distributed together with the transaction item and is read by the code reader 13 of another transaction party TR, the system server 10 accumulates the transaction record of the transaction item of the transaction party TR.

The traceability system 120 is used in combination with the distribution management system 110 and accumulates the transaction record in the same manner as in the distribution management system 110. Specifically, the distribution management system 110 corresponds to an old management system, and the traceability system 120 corresponds to a new management system. The traceability system 120 is operated together with the existing distribution management system 110 without substantially changing the distribution management system 110. In addition to a record generation function of accumulating the transaction record, the traceability system 120 has a record reference function of providing the accumulated transaction record in a manner that allows reference thereto. In the traceability system 120, blockchain technology is used to manage the transaction record for the purpose of preventing tampering with the transaction record.

The traceability system 120 collects the transaction record using the information code CQ2 based on the public code Cd1 issued by the system server 10. The traceability system 120 includes a code output machine 22, the code scanner 23, and a history management server 20. Further, in the traceability system 120, the input terminal 11 and the label printer 12 of the distribution management system 110 are used. The code output machine 22, the code scanner 23, and the input terminal 11 are connected, via a network, to the history management server 20 provided at a data center or the like.

The code output machine 22 is provided at the facility of the transaction party TR where the label printer 12 is provided. The code output machine 22 is provided in a manner that intercepts a communication line between the system server 10 and the label printer 12, and acquires data of the public code Cd1 transmitted from the system server 10 to the label printer 12. The code output machine 22 transmits the acquired data of the public code Cd1 to the history management server 20.

The code output machine 22 receives, from the history management server 20, data of the information code CQ2 generated based on the transmitted public code Cd1. The confidential information used in the traceability system 120 is further recorded in the information code CQ2. The code output machine 22 transmits data of the information code CQ2 to the label printer 12 instead of the data of the public code Cd1. Due to such intervention of the code output machine 22, the label printer 12 prints the information code CQ2 on a paper medium without recognizing any modification (substitution) of the acquired code data. As a result, instead of the public code Cd1, the code-printed medium where the information code CQ2 is printed is attached to the transaction item and distributed together with the transaction item.

The code scanner 23 is a reading device that reads the confidential information that is information recorded in the information code CQ2 and added to the information code CQ2 separately from the public information. Since the code scanner 23 is configured to scan the same target object as the code reader 13, the code scanner 23 may be physically integrated with the code reader 13. The code scanner 23 includes an imaging sensor in which CCD elements are two-dimensionally arrayed, a signal processor 41, and the like. The imaging sensor is capable of reading information recorded on a plane at a higher resolution than the code reader 13. The imaging sensor outputs a captured image in which the information code CQ2 appears (hereinafter referred to as a code captured image) to the signal processor 41.

The signal processor 41 includes a storage unit that stores a code reading program and the like, a processor that executes code reading processing (see FIG. 5) to be described later based on the code reading program, and a RAM. The signal processor 41 decodes a read signal (code captured image) of the imaging sensor according to a predetermined rule through the code reading processing and acquires the confidential information recorded in the information code CQ2. Based on the acquired confidential information, the signal processor 41 communicates with the history management server 20 in order to retain the transaction record.

A smartphone, a tablet terminal, and the like having a camera function may be used as the code scanner 23. In this aspect, a dedicated application corresponding to the code reading program is provided and installed in the smartphone or the like.

The history management server 20 is a host node capable of communicating with the input terminal 11 in addition to the code output machine 22 and the code scanner 23. The history management server 20 is mainly implemented by a computer including a processor 31, a RAM 32, a storage unit 33, an input and output interface, and a bus that connects these units. The processor 31 is hardware coupled with the RAM 32 for computation processing. The processor 31 executes various types of processing related to data management by accessing the RAM 32. The storage unit 33 stores, as one management program related to data management, a code generation program for causing the processor 31 to execute a code generation method according to the present disclosure.

The history management server 20 acquires the item information transmitted from the input terminal 11 to the system server 10. Based on acquisition of the item information, the history management server 20 generates a blockchain that is associated with the transaction item and stores the item information and the transaction record. Upon acquiring a notification that the information code CQ2 is read from the code scanner 23 of each transaction party TR, the history management server 20 accumulates the transaction record of the transaction party TR, from which the notification is issued, in the blockchain associated with the transaction item.

Specifically, upon acquiring the notification from the code scanner 23, the history management server 20 generates a new block for storing the transaction record and the like of the transaction party TR from which the notification is issued. The new block includes a hash value calculated from an immediately preceding block in addition to the current transaction record. A hash function such as SHA-256 is used to generate the hash value. The hash value is data in which a predetermined number of bits (for example, 256 bits) are maintained and in which the item information and the transaction record are reflected.

The history management server 20 executes code generation processing (see FIG. 4) to be described later based on data acquisition of the public code Cd1 from the code output machine 22, and generates the information code CQ2 in which at least the hash value is recorded as the confidential information. The history management server 20 issues the generated information code CQ2 to the code output machine 22. Accordingly, the hash value reflecting the item information and the transaction record is recorded in the information code CQ2 and is available for distribution together with the transaction item.

In the traceability system 120, one information code CQ2 may be continuously used for multiple transaction parties TR, or a new information code CQ2 may be issued for each transaction party TR. In the configuration in which the new information code CQ2 is issued for each transaction party TR, a latest hash value reflecting the transaction record is generated based on occurrence of the transaction record of each transaction party TR. The history management server 20 newly generates the information code CQ2 in which the latest hash value is recorded as the confidential information, and provides data in the new information code CQ2 to the label printer 12 provided at the facility of the transaction party TR who performs a transaction. As a result, as an item transaction progresses, a content (hash value) in the information code CQ2 continues to be updated to a content reflecting the transaction record so far. Since the confidential information mainly includes the hash value, an amount of data in the confidential information can be maintained at a constant level even when the item transaction progresses in the supply chain SC.

The history management server 20 is capable of further issuing a trace code QRt. The trace code QRt is a two-dimensional code such as a QR code attached to a final product FP supplied by the supply chain SC. The trace code QRt enables a consumer who obtains the final product FP to check the transaction record. The trace code QRt records, as an example, a hash value calculated from a last block on the blockchain and an IP address or URL indicating an inquiry destination of the transaction record.

The consumer of the final product FP can view the transaction record of the final product FP by using a user terminal 50 such as a smartphone or a tablet terminal and using a traceability check application. Specifically, upon reading the trace code QRt attached to the final product FP, the user terminal 50 transmits a reference request for the transaction record together with the hash value to the history management server 20 that is the inquiry destination. Upon receiving the reference request, the history management server 20 extracts the item information and the transaction record associated with the hash value and generates retrieval data. The history management server 20 transmits the generated retrieval data to the user terminal 50 that issues the reference request. The consumer of the final product FP can check a history of the transaction record by loading the retrieval data received from the history management server 20 using the traceability check application.

Next, details of the information code CQ2 will be further described with reference to FIGS. 1 and 3.

As described above, the information code CQ2 is generated by combining the public code Cd1 and the confidential code Cd2 (see FIG. 1). The public code Cd1 and the confidential code Cd2 each record information by a two-dimensional array of white cells Cww and black cells Cbw. The public code Cd1 and the confidential code Cd2 are two-dimensional codes having the same number of cells (version). Therefore, the information code CQ2 obtained by combining the public code Cd1 and the confidential code Cd2 is also a two-dimensional code having the same number of cells as the public code Cd1 and the confidential code Cd2.

The information code CQ2 includes a central white cell Cwc and a central black cell Cbc in addition to the white cell Cww and the black cell Cbw. The information code CQ2 retains both the public information and the confidential information in a two-dimensional array of the white cell Cww, the black cell Cbw, the central white cell Cwc, and the central black cell Cbc. Each cell Ce in the information code CQ2 is determined based on a combination of the white cell Cww and the black cell Cbw in each of the public code Cd1 and the confidential code Cd2 (see FIG. 3).

Specifically, the cell Ce at a position where both the public code Cd1 and the confidential code Cd2 are the black cell Cbw is also the black cell Cbw in the information code CQ2. Similarly, the cell Ce at a position where both the public code Cd1 and the confidential code Cd2 are the white cell Cww is also the white cell Cww in the information code CQ2. Meanwhile, the cell Ce at a position where the public code Cd1 is the black cell Cbw and the confidential code Cd2 is the white cell Cww is the central black cell Cbc. The cell Ce at a position where the public code Cd1 is the white cell Cww and the confidential code Cd2 is the black cell Cbw is the central white cell Cwc.

In the central white cell Cwc, a central white region wc surrounded by an outer black region bs is formed. A shape of the central white region wc is similar to a shape of the central white cell Cwc, and is a square or rectangular shape. The central white region wc is located at a center of the central white cell Cwc and is disposed concentrically with the central white cell Cwc. The outer black region bs completely surrounds an entire perimeter of the central white region wc.

In the central black cell Cbc, a central black region bc surrounded by an outer white region ws is formed. A shape of the central black region bc is similar to a shape of the central black cell Cbc, and is a square or rectangular shape. The central black region bc is located at a center of the central black cell Cbc and is disposed concentrically with the central black cell Cbc. The outer white region ws completely surrounds an entire perimeter of the central black region bc.

The central white region wc and the central black region bc have the same size. For example, a length of one side of each of the central white region wc and the central black region bc is about a half to three quarters of a length of one side of each of the central white cell Cwc and the central black cell Cbc. A color of the central white region wc and the outer white region ws is substantially the same as a color of the white cell Cww. Similarly, a color of the central black region bc and the outer black region bs is substantially the same as a color of the black cell Cbw.

Figure 3:
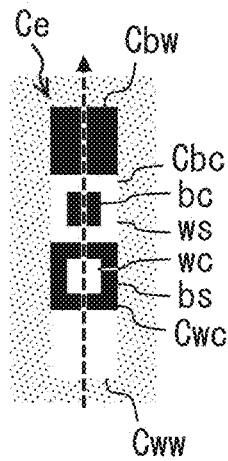
FIG. 3 shows a rule for combining a public code and a confidential code.

Here, the code reader 13 (see FIG. 2) in the distribution management system 110 corresponding to the old management system scans a center of each cell Ce when reading the information code CQ2 (see a dashed arrow in FIG. 3). Therefore, the code reader 13 identifies the central white cell Cwc as the white cell Cww and identifies the central black cell Cbc as the black cell Cbw. As a result, the code reader 13 is capable of recognizing that the information code CQ2 is substantially the same two-dimensional code as the public code Cd1 and reading the public information. Here, in the QR code, information is written in a zigzag manner in order from a lower right cell Ce. Therefore, the general code reader 13 that reads the QR code collectively scans the cells Ce for two rows in a zigzag manner. In such a code reader 13, the center of each cell Ce is a target of scanning, and the information code CQ2 is recognized as the same two-dimensional code as the public code Cd1.

Figure 4:
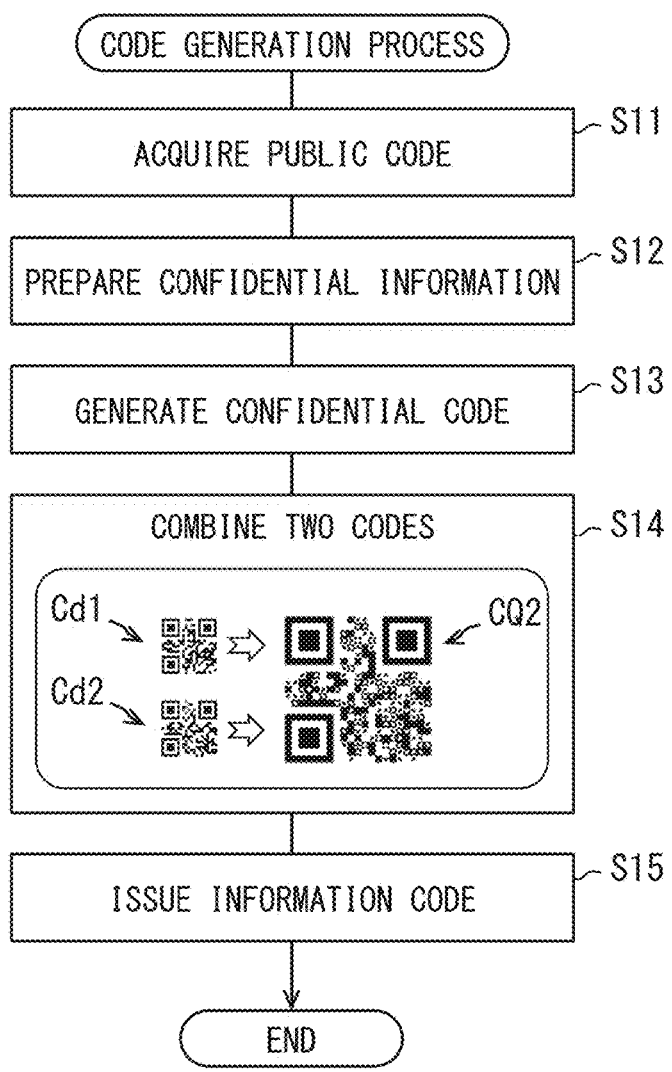
FIG. 4 is a flowchart showing details of code generation processing executed by a history management server.

Next, details of the code generation processing (code generation method) for generating the information code CQ2 described so far will be described below based on FIG. 4 with reference to FIGS. 1 to 3.

In the code generation processing, first, the public code Cd1 and the confidential code Cd2 are prepared. Specifically, the history management server 20 acquires the public code Cd1 by receiving from the code output machine 22 in S11. Next, in S12, the history management server 20 acquires the hash value reflecting the item information and the transaction record, and prepares the confidential information mainly including the hash value. In S13, the history management server 20 generates the confidential code Cd2 that records the confidential information.

The history management server 20 combines the public code Cd1 and the confidential code Cd2 prepared in S11 to S13 by superimposition based on a predetermined rule (see FIG. 3) in S14. As a result, the information code CQ2 is generated in which the white cell Cww, the black cell Cbw, the central white cell Cwc, and the central black cell Cbc are two-dimensionally arrayed. The information code CQ2 generated in this manner is issued to the transaction party TR in S15.

Figure 5:
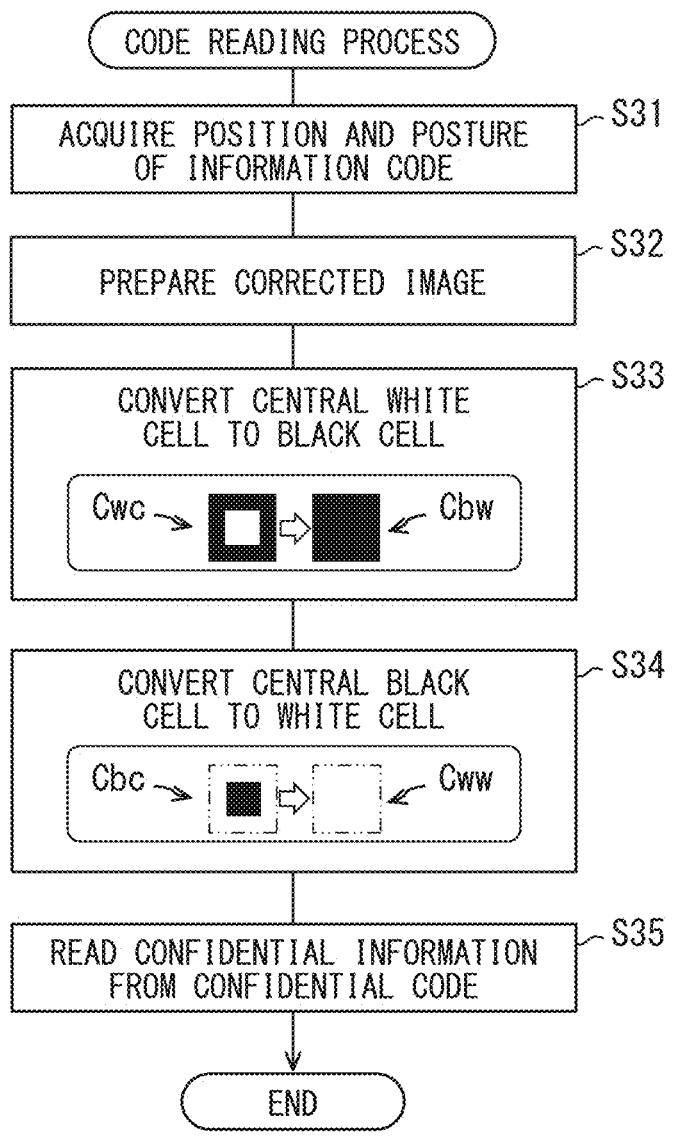
Figure 6:
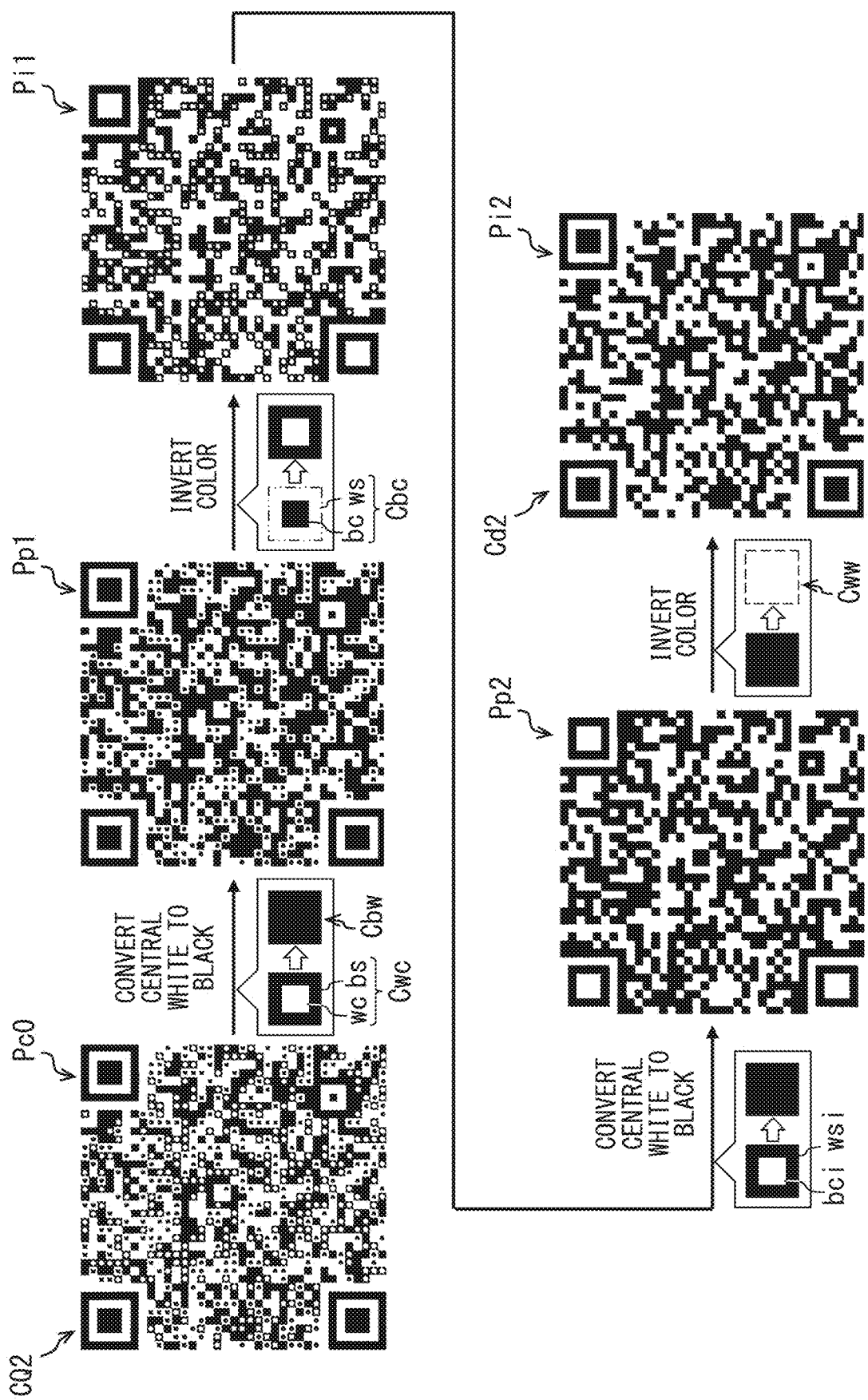
FIG. 6 shows details of image processing for converting a central white cell and a central black cell into a black cell and a white cell.

Next, details of the code reading processing (code reading method) for reading the confidential code Cd2 from the information code CQ2 will be described based on FIGS. 5 and 6 with reference to FIGS. 1 and 2.

In S31 in the code reading processing, the signal processor 41 acquires a position and a posture of the information code CQ2 appearing in the code captured image based on detection of a finder pattern. In S32, the signal processor 41 applies preprocessing such as trapezoidal correction and binarization to a range where the information code CQ2 appears based on information on the position and the posture of the information code CQ2, and prepares a processed image (hereinafter, referred to as a corrected image Pc0, see FIG. 6) suitable for code reading. The corrected image Pc0 is an image corrected to a shape obtained by imaging the information code CQ2 from the front. In addition, in the corrected image Pc0, a gradation value of the entire image is adjusted such that gradation values of the white cell Cww and the central white region wc are substantially the same, and gradation values of the black cell Cbw and the central black region bc are substantially the same.

In S33, the signal processor 41 converts the central white cell Cwc among the cells Ce in the information code CQ2 in the corrected image Pc0 into the black cell Cbw, allowing the central white cell Cwc to be identified as the black cell Cbw.

Specifically, the signal processor 41 executes image processing of filling the central white region wc in the central white cell Cwc with black of the outer black region bs surrounding the central white region wc to generate a first filled image Pp1.

Further, in S34, the signal processor 41 converts the central black cell Cbc among the cells Ce in the information code CQ2 in the first filled image Pp1 into the white cell Cww, allowing the central black cell Cbc to be identified as the white cell Cww. Specifically, the signal processor 41 generates a first inverted image Pi1 in which lightness and darkness (white and black) of colors in the first filled image Pp1 are inverted. In the first inverted image Pi1, the central black region bc is a white region obtained by inverting white and black (hereinafter referred to as an inverted light color region bci), and the outer white region ws is a black region obtained by inverting white and black (hereinafter referred to as an inverted dark color region wsi). The signal processor 41 executes image processing of filling the inverted light color region bci with black of the inverted dark color region wsi to generate a second filled image Pp2. The signal processor 41 inverts lightness and darkness (white and black) of colors in the second filled image Pp2 again to generate a second inverted image Pi2.

Due to above S33 and S34, the central white cell Cwc and the central black cell Cbc become the black cell Cbw and the white cell Cww, respectively, and thus the second inverted image Pi2 is substantially an image obtained by restoring the confidential code Cd2. In S35, the signal processor 41 reads the confidential information from the restored confidential code Cd2, and ends the code reading processing.

The code reading processing may be executed by the history management server 20. In this configuration, the code captured image or the corrected image Pc0 is transmitted from the code scanner 23 to the history management server 20. The history management server 20 executes processing of reading the confidential code Cd2 from the code captured image or the corrected image Pc0 acquired by reception.

In the present embodiment described so far, in addition to the white cell Cww and the black cell Cbw, the central white cell Cwc in which the central white region wc surrounded by the outer black region bs is formed and the central black cells Cbc in which the central black region bc surrounded by the outer white region ws is formed are used. Therefore, even when being affected by light incident on the information code CQ2, a situation where it is difficult to distinguish the central white cell Cwc from the central black cell Cbc is unlikely to occur. As a result, it is possible to reduce code reading failures.

In addition, by adopting the central white cell Cwc and the central black cell Cbc, it is possible to overlap the public code Cd1 on the confidential code Cd2 without using any chromatic color cell or a gray cell Ce that has an intermediate color. Therefore, it is possible to operate the information code CQ2 while continuing use of the label printer 12 that supports only simple monochrome printing. That is, since it is not necessary to introduce a printer that supports a grayscale or color output, an increase in printing cost can be prevented. As a result, the public code Cd1 and the confidential code Cd2 are both capable of maintaining compatibility for code printing while maintaining compatibility for reading.

In the information code CQ2 according to the present embodiment, the central white cell Cwc is identified as the white cell Cww when reading the public code Cd1 and identified as the black cell Cbw when reading the confidential code Cd2. Meanwhile, the central black cell Cbc is identified as the black cell Cbw when reading the public code Cd1 and identified as the white cell Cww when reading the confidential code Cd2. In the case of such an information code CQ2, the information code CQ2 to which the confidential information is added may be operated while continuing use of the existing code reader 13. As described above, according to improvement in compatibility of the traceability system 120 with an old system, it is possible to lower a barrier to introducing the traceability system 120.

In addition, in the present embodiment, the shape of the central white region wc is similar to the shape of the central white cell Cwc, and the shape of the central black region bc is similar to the shape of the central black cell Cbc. In this way, it is possible to easily generate image data of the information code CQ2 even though the information code CQ2 includes the central white cell Cwc and the central black cell Cbc. As a result, a processing load of the code generation processing is reduced, and it is possible to quickly issue the information code CQ2.

In the present embodiment, in the step of treating the central white cell Cwc as the black cell Cbw, the first filled image Pp1 in which the central white region wc is filled with the dark color of the outer black region bs is generated. Further, in the step of treating the central black cell Cbc as the white cell Cww, the first inverted image Pi1 obtained by inverting the lightness and darkness of the colors in the first filled image Pp1 is prepared, and the second filled image Pp2 is generated in which the inverted light color region bci in the first inverted image Pi1 is filled with the dark color of the inverted dark color region wsi. Then, the second inverted image Pi2 is generated in which the lightness and darkness of the colors in the second filled image Pp2 are inverted. As described above, according to the image processing in which the central white cell Cww and the central black cell Cbw are filled sequentially, it is possible to speed up the processing of restoring the confidential code Cd2 from the information code CQ2. As a result, the confidential information can be quickly read from the information code CQ2.

In the embodiment, the signal processor 41 corresponds to a "processor" that implements the code reading method, the public code Cd1 corresponds to a "first code", and the confidential code Cd2 corresponds to a "second code". The white cell Cww corresponds to a "light color cell", the black cell Cbw corresponds to a "dark color cell", the central white cell Cwc corresponds to a "central light color cell", and the central black cell Cbc corresponds to a "central dark color cell". Further, the central white region wc corresponds to a "central light color region", the central black region bc corresponds to a "central dark color region", the outer white region ws corresponds to an "outer light color region", and the outer black region bs corresponds to an "outer dark color region".

A technical idea that can be further grasped from the embodiment described so far will be described below as Appendices 1 and 2.

Appendix 1

A code generation apparatus that generates an information code by combining a first code with a second code, in each the first code and the second code, information being recorded by multiple cells arranged in a two-dimensional array, the code generation apparatus comprising:
  a code preparation unit configured to prepare the first code and the second code; and
  a code combining unit configured to generate the information code by combining the first code with the second code, wherein
  the code combining unit
    sets a light color cell at a position where the first code and the second code both have light color cells,
    sets a dark color cell at a position where the first code and the second code both have dark color cells,
    sets a central light color cell at a position where the first code has the light color cell and the second code has the dark color cell, the central light color cell includes an outer dark color region and a central light color region surrounded by the outer dark color region, and
    sets a central dark color cell at a position where the first code has the dark color cell and the second code has the light color cell, the central dark color cell includes an outer light color region and a central dark color region surrounded by the outer light color region.

Appendix 2

A code reading apparatus that reads a second code from an information code, the information code being generated by combining a first code with the second code, in each of the first code and the second code, information being recorded by multiple cells arranged in a two-dimensional array, the code reading apparatus comprising:
  an image acquisition unit configured to acquire a code image in which the information code is captured; and
  an image conversion unit configured to
    determine, for each of the multiple cells included in the information code, a central light color cell, which includes an outer dark color region and a central light color region surrounded by the outer dark color region, as a dark color cell, and
    determine, for each of the multiple cells included in the information code, a central dark color cell, which includes an outer light color region and a central dark color region surrounded by the outer light color region, as a light color cell.

In the present disclosure, the history management server 20 corresponds to the "code generation apparatus", and the history management server 20 or the code scanner 23 corresponds to the "code reading apparatus".

Other Embodiments

Although one embodiment according to the present disclosure has been described above, the present disclosure is not construed as being limited to the embodiment and can be applied to various embodiments and combinations within a scope not departing from the spirit of the present disclosure.

Figure 7:
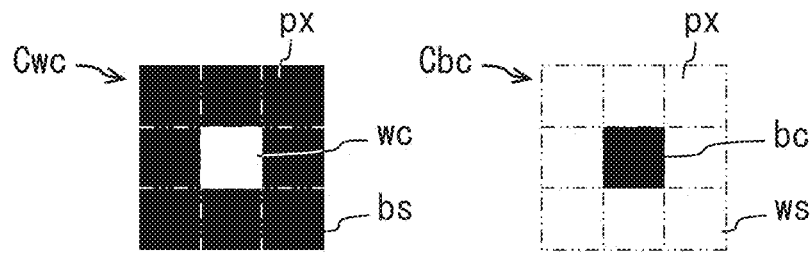
FIG. 7 shows a central white cell and a central black cell in a first modification.

Shapes and sizes of the central black region bc and the central white region wc are not limited to those in the embodiment and may be appropriately changed. For example, when the information code CQ2 is prepared as image data, one cell includes multiple rectangular pixels px disposed vertically and horizontally. Specifically, in a first modification shown in FIG. 7, one cell includes an array of three pixels px in each of vertical and horizontal directions.

In the central white cell Cwc according to such a first modification, one central pixel px forms the central white region wc, and eight pixels px surrounding the central pixel px form the outer black region bs. Similarly, in the central black cell Cbc, one central pixel px forms the central black region bc, and eight pixels px surrounding the central pixel px form the outer white region ws.

Figure 8:
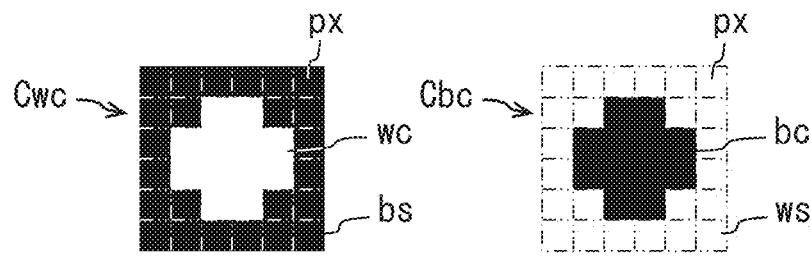
FIG. 8 shows a central white cell and a central black cell in a second modification.

In a second modification shown in FIG. 8, one cell includes an array of a large number of (for example, six) pixels px. In the second modification, the central white region wc and the central black region bc are formed not in a rectangular shape but in a cross shape. As in the first and second modifications described above, the shapes and the sizes of the central white region wc and the central black region bc may be appropriately changed according to the number and the shape of the pixels px constituting each cell. The shapes and sizes of the central white region wc and the central black region bc may be appropriately changed according to a resolution and an individual dot shape of the label printer 12, or a resolution and an individual display pixel shape of a display device.

Figure 9:
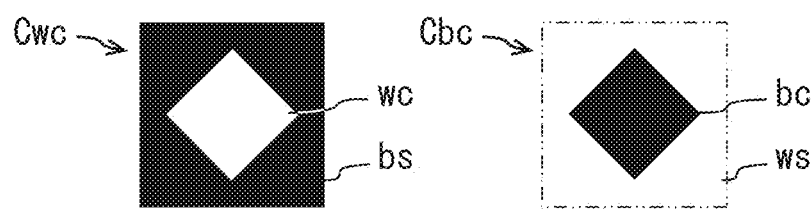
FIG. 9 shows a central white cell and a central black cell in a third modification.
Figure 10:
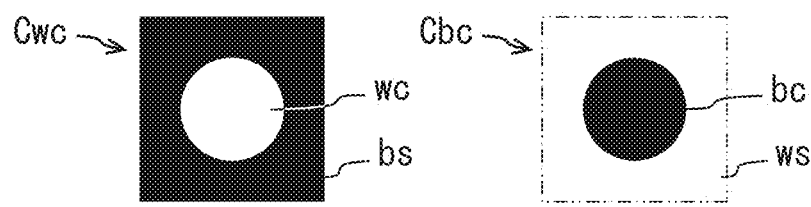
FIG. 10 shows a central white cell and a central black cell in a fourth modification.

In a third modification shown in FIG. 9, the central white region wc and the central black region bc each have a square shape in a posture rotated by 45° relative to outer edges of the central white cell Cwc and the central black cell Cbc, that is, a rhombus shape. In a fourth modification shown in FIG. 10, the central white region wc and the central black region bc each have a circular shape concentric with the central white cell Cwc and the central black cell Cbc.

Further, in a fifth modification, a center of each of the central white region wc and the central black region bc is offset from centers of the central white cell Cwc and the central black cell Cbc. In a sixth modification, the shapes and the sizes of the central black region bc and the central white region wc are different from each other. In addition, in a seventh modification, the outer black region bs and the outer white region ws partially surround the central white region wc and the central black region bc. In such a seventh modification, as long as the image processing of filling the central white region wc and the central black region bc is executable, the outer black region bs and the outer white region ws may not surround the entire perimeter of the central white region wc and the central black region bc.

In the embodiment, a light color forming the white cell Cww, the central white region wc, and the outer white region ws may not be strictly white. For example, a color of a base material such as a label where the information code CQ2 is printed (for example, fairly light gray or ivory) may correspond to the light color. Similarly, a dark color forming the black cell Cbw, the central black region bc, and the outer black region bs may not be strictly black. For example, a color of ink used in the label printer 12 (for example, dark blue or dark green) may correspond to the dark color.

The public code Cd1 and the confidential code Cd2 are not limited to QR codes. Two-dimensional codes other than the QR codes may be used as the first code and the second code and combined into the information code. Further, when QR codes are used as the codes, an error correction capability (error correction level) may differ. As an example, an error correction level of the confidential code Cd2 is higher than an error correction level of the public code Cd1.

The information code CQ2 according to the present disclosure may be used by a system different from the distribution management system 110 and the traceability system 120. Further, information recorded in the first code and the second code that are sources of the information code is not limited to the public information and the confidential information, and may be appropriately changed according to use of the information code.

In the embodiment, in addition to the information code CQ2 used in the supply chain SC, the trace code QRt is issued and attached to the final product FP. However, the information code CQ2 may be used as the trace code QRt. In this case, the traceability check application executes the code reading processing and provides the user terminal 50 with a function for reading the confidential code Cd2. The final product FP supplied by the supply chain SC may be appropriately changed. For example, the traceability system 120 may manage various articles such as an automobile, a battery, a semiconductor, fresh food, an aquatic product, food, flowers, a pharmaceutical, or a chemical.

The hash function used in the history management server 20 is a cryptographic hash function and has a characteristic that the same hash value is not output from different inputs and it is substantially impossible to estimate an input from the output hash value. For example, instead of SHA-256, an encryption algorithm such as SHA-1, SHA-2, or SHA-3 may be appropriately used according to an output length (the number of bits) recordable in the confidential code Cd2 as the confidential information. The code generation processing executed by the history management server 20 may be executed by the code output machine 22 or the like on an edge side. In this aspect, the code output machine 22 corresponds to the "code generation apparatus".

In the embodiment, functions provided by the history management server, the code scanner, and the like may be provided by software and hardware for executing the software, only software, only hardware, or a composite combination thereof. When such functions are provided by an electronic circuit as the hardware, each function may be provided by a digital circuit including a large number of logic circuits or an analog circuit.

The processor (signal processor) in the embodiment may include at least one computational core such as a central processing unit (CPU) and a graphics processing unit (GPU). The processor may further include a field-programmable gate array (FPGA), a neural network processing unit (NPU), and an IP core having another dedicated function.

A form of a non-transitory tangible storage medium that is adopted as each storage unit in the embodiment and stores each program related to code generation and code reading in the present disclosure may be appropriately changed. For example, the storage medium is not limited to a configuration provided on a circuit board, and may be provided in a form of a memory card, inserted into a slot portion, and electrically connected to a bus of a computer. Further, the storage medium may be an optical disc, a hard disc drive, or the like serving as a basis for copying a program to a computer.

The control unit and the method thereof described in the present disclosure may be implemented by a dedicated computer constituting a processor programmed to execute one or multiple functions embodied by a computer program. Alternatively, the apparatus and the method thereof according to the present disclosure may be implemented by a dedicated hardware logic circuit. Alternatively, the apparatus and the method thereof according to the present disclosure may be implemented by one or more dedicated computers implemented by a combination of a processor that executes a computer program and one or more hardware logic circuits. The computer program may be stored in a computer-readable non-transient tangible recording medium as an instruction executed by a computer.

What is claimed is:

1. A display medium comprising an information code, wherein
    the information code is displayed on the display medium,
    the information code is generated by combining a first code and a second code,
    in each of the first code and the second code, information is recorded by multiple cells arranged in a two-dimensional array, and
    the information code includes:
        a light color cell;
        a dark color cell;
        a central light color cell which includes a central light color region and an outer dark color region, the central light color region being surrounded by the outer dark color region within the central light color cell; and
        a central dark color cell which includes a central dark color region and an outer light color region, the central dark color region being surrounded by the outer light color region within the central dark color cell.

2. The display medium according to claim 1, wherein
    the central light color cell is identified as the light color cell in a reading of the first code,
    the central light color cell is identified as the dark color cell in a reading of the second code,
    the central dark color cell is identified as the dark color cell in the reading of the first code, and
    the central dark color cell is identified as the light color cell in the reading of the second code.

3. The display medium according to claim 1, wherein
    a shape of the central light color region is similar to a shape of the central light color cell, and
    a shape of the central dark color region is similar to a shape of the central dark color cell.

4. A code generation method to be executed by at least one processor and causing the at least one processor to perform:
    preparing a first code and a second code in each of which information is recorded by multiple cells arranged in a two-dimensional array; and
    generating an information code by combining the first code with the second code,
    wherein the combining of the first code with the second code includes:
        setting a light color cell at a position where the first code and the second code both have light color cells;
        setting a dark color cell at a position where the first code and the second code both have dark color cells;
        setting a central light color cell at a position where the first code has the light color cell and the second code has the dark color cell, the central light color cell including a central light color region and an outer dark color region and the central light color region being surrounded by the outer dark color region; and
        setting a central dark color cell at a position where the first code has the dark color cell and the second code has the light color cell, the central dark color cell including a central dark color region and an outer light color region and the central dark color region being surrounded by the outer light color region.

5. A code reading method to be executed by at least one processor, the code reading method reading a second code from an information code, the information code being generated by combining a first code with the second code, in each of the first code and the second code, information being recorded by multiple cells arranged in a two-dimensional array, the code reading method comprising:
- determining, for each of the multiple cells included in the information code, a central light color cell, which includes an outer dark color region and a central light color region surrounded by the outer dark color region, as a dark color cell; and
- determining, for each of the multiple cells included in the information code, a central dark color cell which includes an outer light color region and a central dark color region surrounded by the outer light color region, as a light color cell.

6. The code reading method according to claim 5, wherein
the determining of the central light color cell as the dark color cell includes generating a first filled image by filling the central light color region with a dark color of the outer dark color region, and
the determining of the central dark color cell as the light color cell includes:
- generating a first inverted image by inverting lightness and darkness of color in the first filled image;
- generating a second filled image from the first inverted image, in the second filled image, an inverted light color region generated by inverting lightness and darkness of the central dark color region in the first inverted image is filled with a dark color of an inverted dark color region generated by inverting lightness and darkness of the outer light color region in the first inverted image; and
- generating a second inverted image by inverting lightness and darkness of color in the second filled image.

* * * * *